March 19, 1940.  C. SCHOLL  2,194,327
OVERLOAD-RELEASE DRIVE CONNECTION
Original Filed Sept. 21, 1936  2 Sheets-Sheet 1
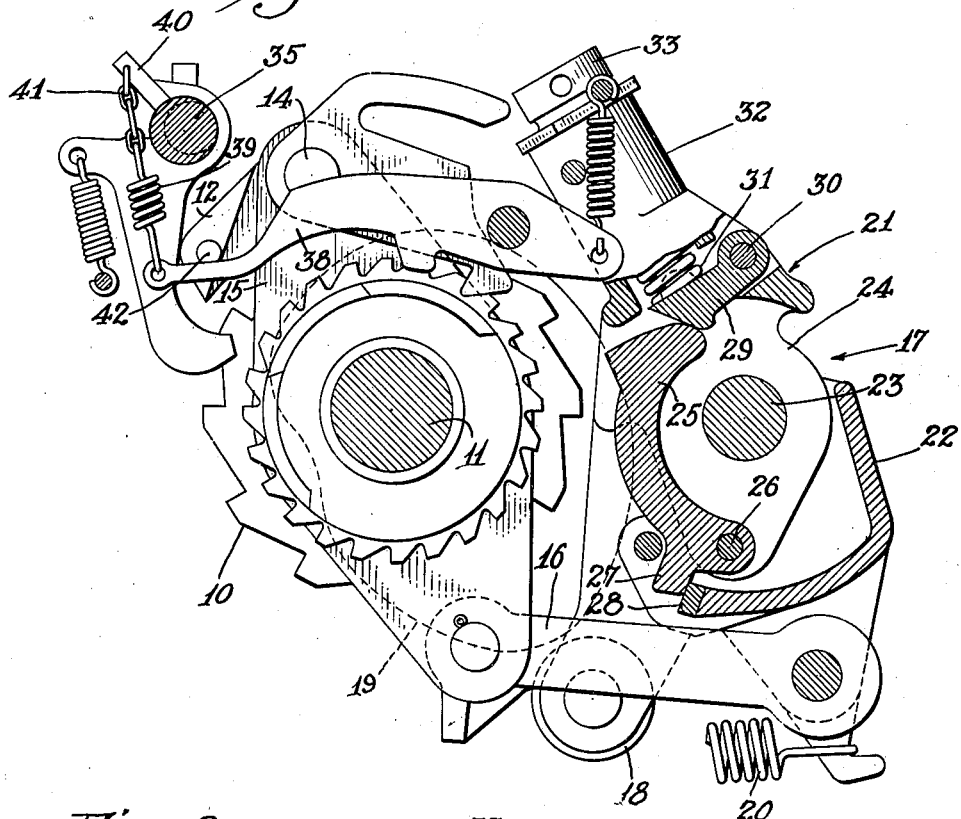
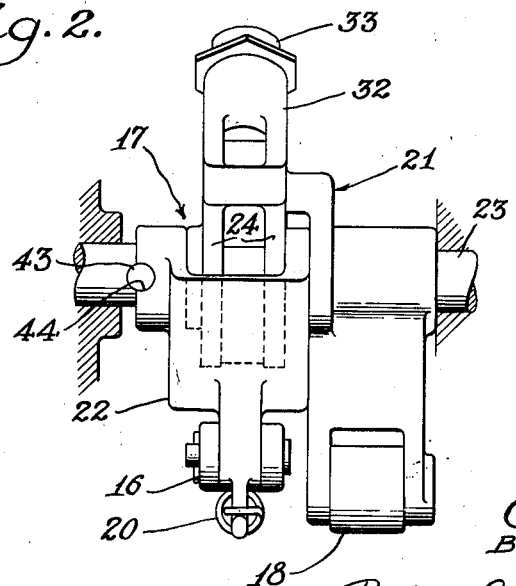
Inventor
Clark Scholl
BY
Parker, Carlson, Pitney & Hubbard
Attorneys.

March 19, 1940.  C. SCHOLL  2,194,327
OVERLOAD-RELEASE DRIVE CONNECTION
Original Filed Sept. 21, 1936    2 Sheets-Sheet 2
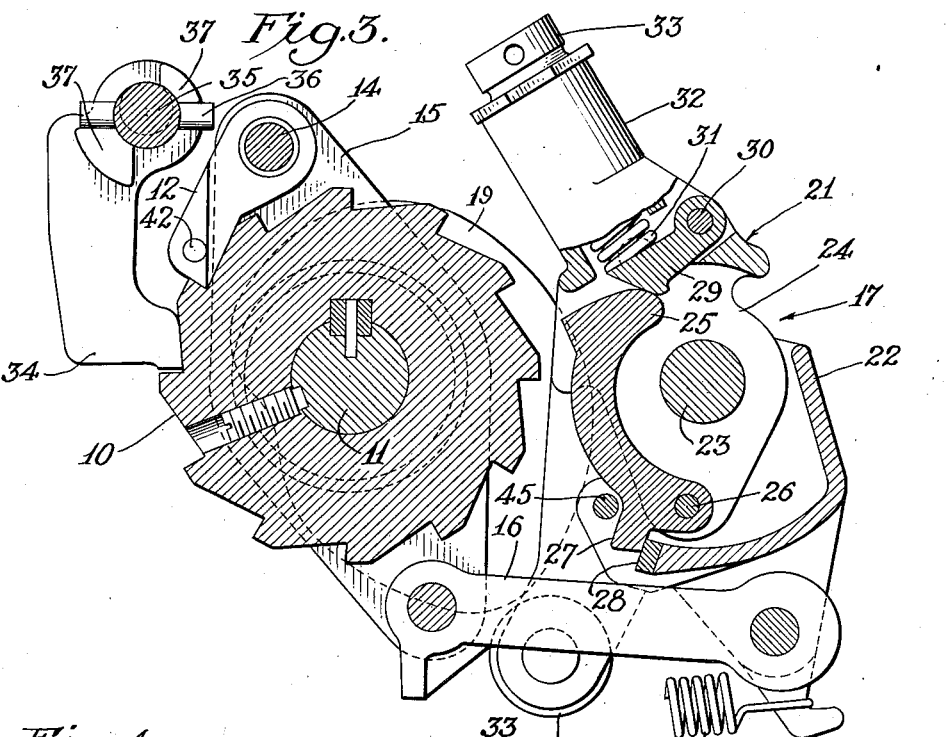
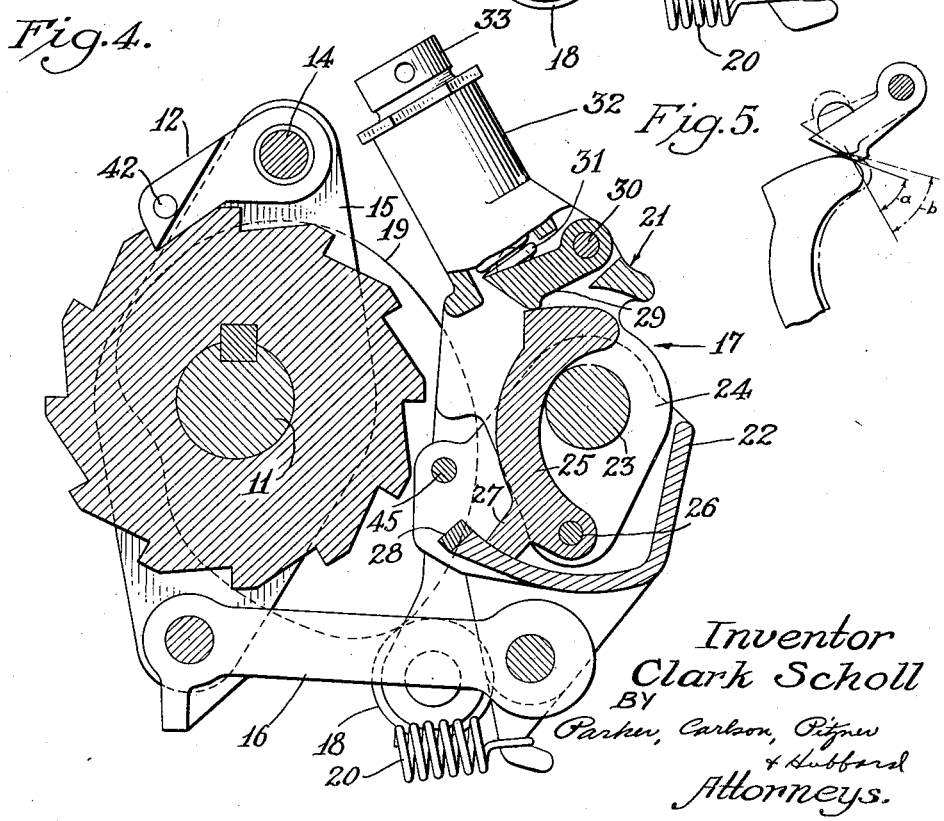
Inventor
Clark Scholl
BY Parker, Carlson, Pitzner & Hubbard
Attorneys.

Patented Mar. 19, 1940

2,194,327

UNITED STATES PATENT OFFICE 2,194,327

OVERLOAD-RELEASE DRIVE CONNECTION

Clark Scholl, Springfield, Ohio, assignor to The Steel Products Engineering Company, Springfield, Ohio, a corporation of Ohio Original application September 21, 1936, Serial No. 101,758. Divided and this application May 11, 1938, Serial No. 207,202

5 Claims. (Cl. 192—56)

The invention relates to overload-release drive connections and more particularly to an improved form of such connection which is especially adapted for use in a driving mechanism of a screw conveyer or other fuel feeding means of a stoker. The present application is a division of my application Serial No. 101,758 filed September 21, 1936.

It is an object of the present invention to provide an overload-release drive connection or clutch which is rugged in construction, capable of transmitting relatively heavy loads and economical to manufacture.

Still another object of the present invention is to provide a device of the type set forth which is actuated smoothly to disengaged position upon the appliaction of an overload without danger of sticking or sluggishness of action.

Further objects and advantages of the invention will become apparent as the following description proceeds taken in connection with the accompanying drawings, in which:

Figure 1 is a side elevation of a portion of a power transmission mechanism provided with an overload-release connection embodying the present invention.

Fig. 2 is an end elevation of the overload-release connection shown in Fig. 1.

Figs. 3 and 4 are vertical sectional views of the apparatus of Fig. 1 illustrating the overload-release connection respectively in its engaged and disengaged positions.

Fig. 5 is a diagrammatic representation of the movement of the cooperating latch and pawl of the overload-release connection.

For purposes of illustration of its various novel features, the invention has been shown and described herein as applied to a power transmission mechanism for a stoker designed particularly for domestic use. The power transmission mechanism partially illustrated herein is of the form described and claimed in my copending application Serial No. 101,758 referred to above.

The parts of the transmission mechanism shown include in general a ratchet wheel 10 fast on a driven shaft 11 and arranged to be rotated by a cooperating main drive pawl 12. This pawl is pivoted on a pin 14 between the ends of a pair of spaced radius plates 15 loosely journaled for oscillatory movement on the shaft 11 and disposed on opposite sides of the ratchet wheel 10. Oscillatory movement is imparted to the radius plates 15 through a link 16 connected through an overload-release connection, designated generally by the numeral 17, to a cam follower roller 18. This cam follower is urged into engagement with a peripheral cam 19 by a helical tension spring 20, the cam being journaled on the shaft 11. Any suitable prime mover, such as an electric motor, may be utilized to rotate the cam 19. In general, it will be seen that rotation of the cam 19 causes the radius plates 15 to be oscillated so that the pawl 13 engages successive teeth on the ratchet wheel 10 advancing the same step by step. The resulting step by step movement of the driven shaft 11 may be utilized to move a screw conveyer of a stoker or similar mechanism.

It has heretofore been proposed to connect certain parts of stoker drive mechanisms by frangible pins so that the connection between the driving motor and fuel conveyer will be interrupted upon breakage of the pin when an overload is imposed thereon due to an obstruction in the conveyer or for any other reason. Such an arrangement has the disadvantage, however, that the parts of the broken pin must be dislodged and a new pin put in to replace it. This operation may be difficult for an unskilled operator to perform, especially if the pin is not located in a readily accessible part of the mechanism. Also, a replacement pin of the proper frangibility is frequently not available so a nail or any other substitute which comes to hand is used and consequently the driving mechanism together with its prime mover are subjected to the liability of dangerous overloads. The improved overload-release mechanism herein described obviates these difficulties in that it may be readily reset after the obstruction has been cleared and does not require any replacement parts for the resetting.

In the particular construction illustrated, the overload-release connection 17 is interposed between a cam follower yoke or driving member 21, carrying the cam follower roller 18, and a driven member 22, both of which members are rockably mounted on a shaft 23 paralleling the driven shaft 11. As best shown in Fig. 2, the member 22 is U-shaped in cross section as is the cam follower 21. A bifurcated leg 24 on the cam follower member 21 extends within the legs of the member 21 and is journaled on the shaft 23.

The overload-release connection preferably includes an arcuate-top clutch pawl 25 pivotally supported between the legs 24 by a pin 26 (Fig. 3). A projection 27 on the clutch pawl 25 is positioned to engage a hardened steel insert 28 cast in the oscillatable member 22. The clutch pawl 25 is normally maintained with the projection 27 in contact with the insert 28 by a latch 29, which is pivotally connected to the member 21 by a pin 30. A compression spring 31 mounted within a tubular extension 32 formed on the upper end of the member 22 serves to releasably maintain the latch 29 in contact with the clutch pawl 25. A suitable adjusting nut 33 is threaded in the upper end of the extension 32 and bears against the upper end of the compression spring 31 so that the compressive force exerted by the latter may be selectively varied. It will thus be seen that the compression spring 31 normally maintains the latch 29 in engagement with the clutch pawl 25 so that the member 22 is rotated in a counterlockwise direction (as viewed in Fig. 3) upon similar movement of the cam follower 21. In the opposite or clockwise oscillation of the cam follower member 22, the tensioning spring 20, anchored to some fixed support, serves to maintain the members 21 and 22 in what may be termed a normal or operative relative position in which the insert 28 is pressed tightly against the projection 27.

If an overload is imposed on the driving mechanism due, for example, to an obstruction in the fuel conveyer, the member 22 stops and the cam follower member 21 is permitted to move relative to it, out of its normal or operative relative position, by the movement of the pawl 25 past the latch 29. In this latter movement the pawl 25 cams the latch 29 upwardly compressing the spring 31. Accordingly this resistance of the spring 31 to the movement of the pawl 25 prevents such movement until a predetermined overload is exerted on the device. The disengaged position of the overload-release connection or clutch is illustrated in Fig. 4. When in this disengaged position, further rotation of the cam 19 will not effect any movement of the drive pawl 12 so that the driving mechanism is rendered entirely inoperative. The compression in the spring 31 may be adjusted by the nut 33 so as to vary the load selectively at which the overload clutch release mechanism will trip.

In order to avoid sticking of the release mechanism, due to the increased force exerted by the spring 31 as the latch 29 rides upwardly on the pawl 25, the cooperating end surfaces of the pawl and latch are generally rounded and preferably made arcuate in shape, the arcs being tangential and that on the latch of slightly greater radius than that of the pawl. The pawl and latch move under overload from their normal positions, shown in full lines in Fig. 5, until they occupy the dot-dash line positions indicated, at the instant of breaking apart. In such case, the pressure angle therebetween increases from a to b and to some extent compensates for the increasing spring pressure. As a result, the release mechanism trips at the selected overload value without substantial variation.

As a preliminary to the resetting of the overload-release connection, after it has been tripped, the main feed pawl 12 and a backup pawl 34 (Fig. 3) are disengaged from the ratchet wheel 10 so that the radius plates 15 may be oscillated about the driven shaft 11 in order to bring the member 22 back into its normal or operative position relative to the cam follower 21. In this preliminary operation, a shaft 35 carrying the backup pawl 34, is rotated in a clockwise direction (as viewed in Fig. 1) from the position shown in Fig. 5 to that of Fig. 1. One end of the shaft 35 may be squared so that a suitable wrench may be attached to it. The eccentric mounting of the shaft 35 causes it to raise the backup pawl 34 during approximately three-quarters of the clockwise movement of the shaft noted so as to totally or partially relieve the load on the backup pawl. During the last part of the rotative movement of the shaft 35, a pin 36 (Fig. 5) in the shaft engages a shoulder 37 on the hub of the pawl 34, (Fig. 3) thus turning the pawl completely out of engagement with the teeth of the ratchet wheel 10. A detent 38 also connected to the shaft 35 is utilized to lift the main feed pawl 12 out of engagement with the ratchet wheel. This connection includes a tension spring 39 secured to the outer end of the detent 38, the other end of the spring being connected to a pin 40 on the shaft 35 by a chain 41 (Fig. 1). As the shaft 35 is turned in a clockwise direction, the outer end of the detent 38 will thus be lifted so that it engages a pin 42 on the main feed pawl 12, lifting the same out of engagement with the ratchet wheel 10. The spring 39 is interposed between the shaft 35 and the detent 38 so that if the main feed pawl 12 is contacting a tooth of the ratchet wheel under load, the detent 38 will not raise the main feed pawl until the load has been relieved by turning the driven shaft 11 a short distance. This spring arrangement is desirable because of the light construction of the detent 38. One end of the driven shaft 11 may be squared so that it can be readily turned by a suitable wrench.

After this preliminary disengagement of the pawl and ratchet mechanism, the overload-release connection or clutch may be reset by turning the shaft 23 in a counterclockwise direction (as viewed in Fig. 4). One end of this shaft may also be squared so that it can be readily engaged by a suitable wrench. As the shaft 23 is thus rotated in a counterclockwise direction, a pin 43 which extends therethrough (Fig. 2) engages a complemental notch 44 formed on the hub of the member 22 and thus causes the member 22 to move in a counterclockwise direction about the shaft 23 and into operative position relative to the cam follower 21. By the time that the member 22 has been rotated sufficiently so that the contacting surface of the projection 27 on the clutch pawl 25 can be brought into working position against the steel insert 28, a pin 45 (Fig. 3) rigidly mounted on the member 22 engages the rear side of the projection 27 and turns the clutch pawl 25 thus holding the latch spring 31 compressed until the upper end of the clutch pawl snaps into place at the forward end of the spring pressed latch 29. Since the top surface of the pawl 25 is radial with respect to the pivotal axis at 26 (see Figs. 1, 3 and 4) there is no further compression of the spring during the resetting operation and the latter is thus made easy. It will thus be seen that the overload-release connection may be readily reset by a simple manipulation of the apparatus. Moreover, the resetting operation is substantially instantaneous in that a latch need not be held in operative position until certain other parts of the apparatus have been rotated into proper position after starting of the prime mover.

After the overload-release connection has been reset as described above, the shaft 35 is rotated to its initial position so that the pawls 13 and 34 are again brought into engagement with the ratchet wheel 10. The mechanism is then completely conditioned for further normal operation.

While a preferred embodiment of the device has been illustrated and described, it is contemplated that various changes, alterations or modifications may be made without departing from the spirit and scope of the invention as expressed in the appended claims.

I claim as my invention:

1. An overload-release drive connection comprising driving and driven members mounted for oscillation about a common axis, a pawl movably secured to one of said members, means including a spring biased overload-released latch for releasably retaining said pawl in position to engage positively the other of said members during oscillations of said driving member in one direction only, and means yieldably urging said driven member in the opposite direction for causing said driven member to follow the return oscillations of said driving member and for alternatively retaining said driven member in an inoperative position at one extremity of its path of movement upon the release of said latch.

2. An overload-release drive connection comprising driving and driven members mounted for oscillation about a common axis, a pawl pivotally mounted on said driving member, an abutment on said driven member, means including a spring biased overload-released latch on said driving member releasably retaining said pawl pressed against said abutment for positively connecting said members during oscillations of said driving member in one direction only, and means yieldably urging said driven member in the opposite direction for causing said driven member to follow the return oscillations of said driving member and for alternatively retaining said driven member in an inoperative position at one extremity of its path of movement upon the release of said latch.

3. An overload-release drive connection comprising a pair of members mounted for oscillation about a common axis, said members being provided with interengaging portions, means including a spring connected to one of said members for maintaining said interengaging portions in operative engagement during oscillation of said members in one direction, and means including a spring pressed latch for releasably maintaining said interengaging portions in operative engagement during oscillation of said members in the opposite direction.

4. An overload-release drive connection comprising, in combination, a pair of members mounted for oscillation about a common axis, a clutch pawl pivotally mounted on one of said oscillatable members and movable into and out of operative engagement with the other of said oscillatable members, said pawl being provided with an arcuate bearing surface, and means including a spring urged latch engageable with said pawl and presenting an arcuate bearing surface arranged to press against that on said pawl in tangential relation thereto for exerting pressure on said pawl through a pressure angle which increases upon movement of said pawl and latch to disengaged position.

5. An overload-release drive connection comprising, in combination, a pair of members mounted for oscillation about a common axis, a clutch pawl pivotally mounted on one of said members and movable into and out of operative engagement with the other of said members, a latch having a nose portion engageable with said pawl, means including a compression spring for urging said latch into engagement with said pawl, and said pawl being provided with an arcuate surface radially disposed with respect to the pivotal axis of said pawl and which surface is located to ride beneath the nose of said latch during the resetting of said pawl, whereby substantially no increased pressure is placed on said latch spring as said surface rides beneath said latch during the resetting of the pawl.

CLARK SCHOLL.